United States Patent
Phelps et al.

(10) Patent No.: US 7,968,812 B2
(45) Date of Patent: Jun. 28, 2011

(54) SPRING JOINT WITH OVERSTRAIN SENSOR

(75) Inventors: Peter M. Phelps, Glenn Dale, MD (US); Bryan W. Gaither, Clarksville, TN (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 349 days.

(21) Appl. No.: 12/353,009

(22) Filed: Jan. 13, 2009

(65) Prior Publication Data

US 2010/0175977 A1    Jul. 15, 2010

(51) Int. Cl.
*H01H 1/06* (2006.01)

(52) U.S. Cl. .................................................. 200/276

(58) Field of Classification Search .............. 200/502, 200/276, 50.32, 295; 267/175; 439/372, 439/345, 346, 41, 42, 953, 248, 219, 841, 439/909

See application file for complete search history.

(56) References Cited

U.S. PATENT DOCUMENTS

| 3,300,600 | A | * | 1/1967 | Wermager et al. | 200/50.32 |
| 4,978,312 | A | * | 12/1990 | Fodali | 439/219 |
| 7,507,099 | B2 | * | 3/2009 | Cowgill et al. | 439/248 |
| 7,855,345 | B2 | * | 12/2010 | Stevens et al. | 200/83 S |
| 2002/0025714 | A1 | * | 2/2002 | Wilcox | 439/372 |

* cited by examiner

*Primary Examiner* — Edwin A Leon
(74) *Attorney, Agent, or Firm* — Heather Goo

(57) ABSTRACT

A flexible joint may include a conductive compression spring and a pair of non-conductive spring cages disposed at opposite ends of the compression spring to support the compression spring. A conductive member disposed inside the compression spring may extend between the pair of spring cages. One end of the conductive member may be fixed for movement with one of the spring cages and another end of the conductive member may be fixed for movement with the other of the spring cages.

19 Claims, 3 Drawing Sheets

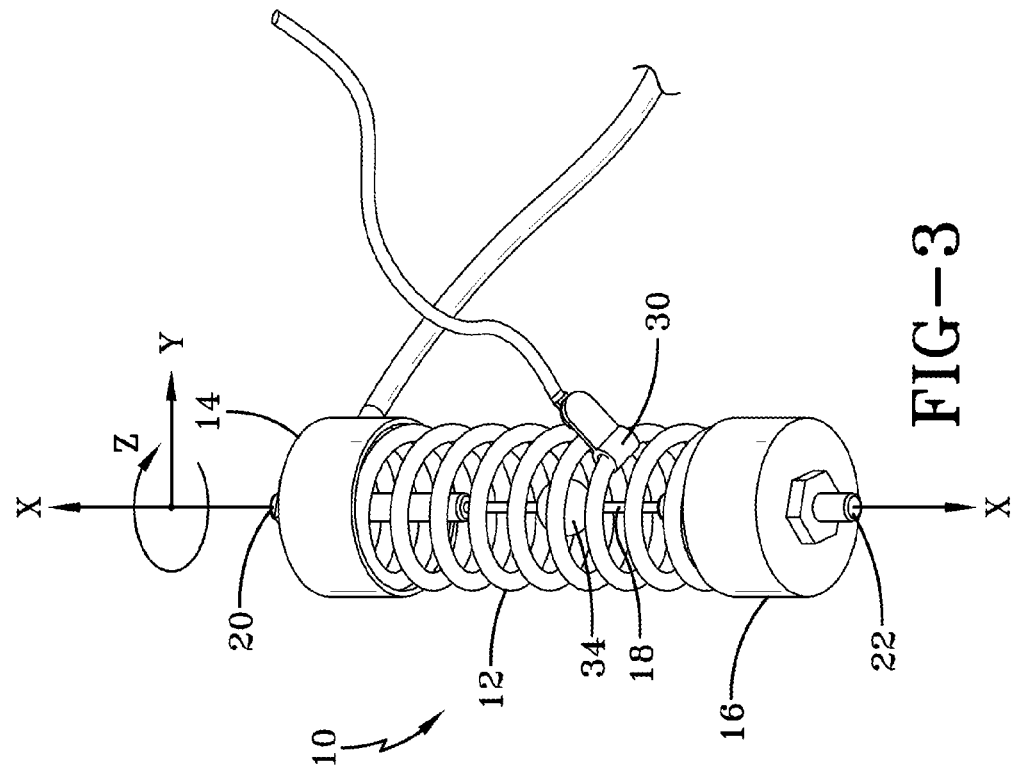
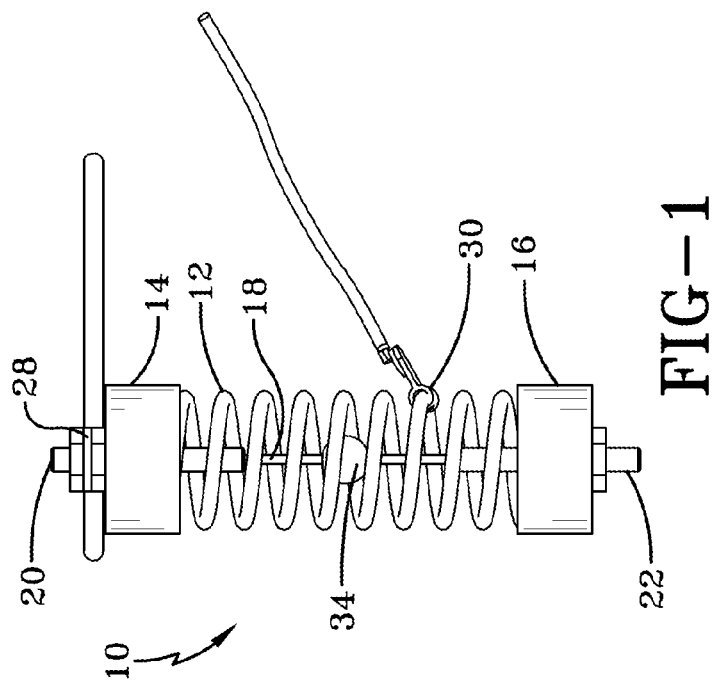
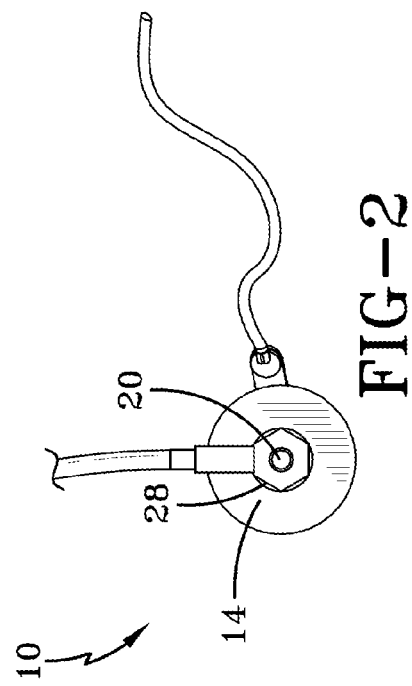
FIG-1
FIG-2
FIG-3

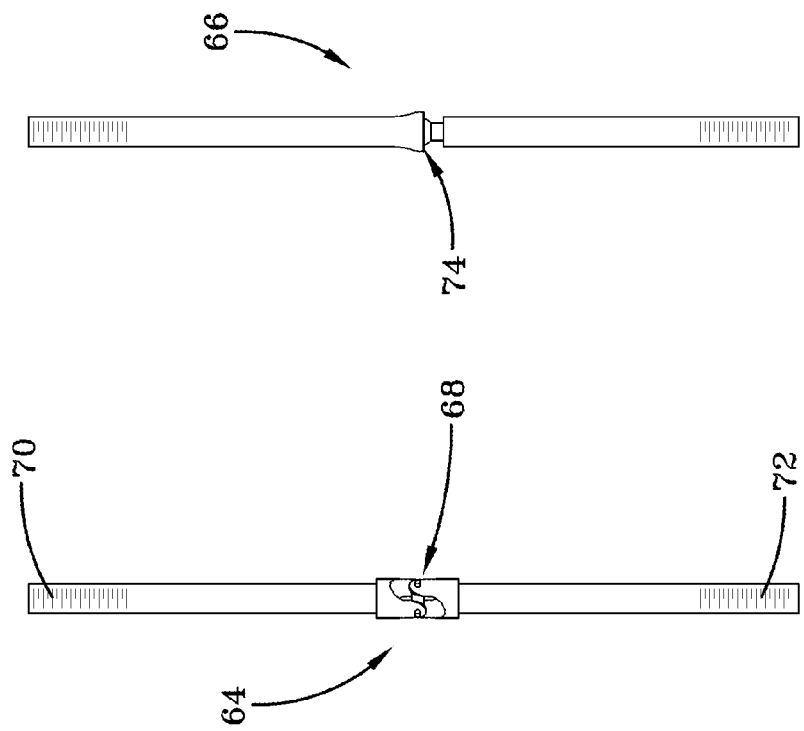
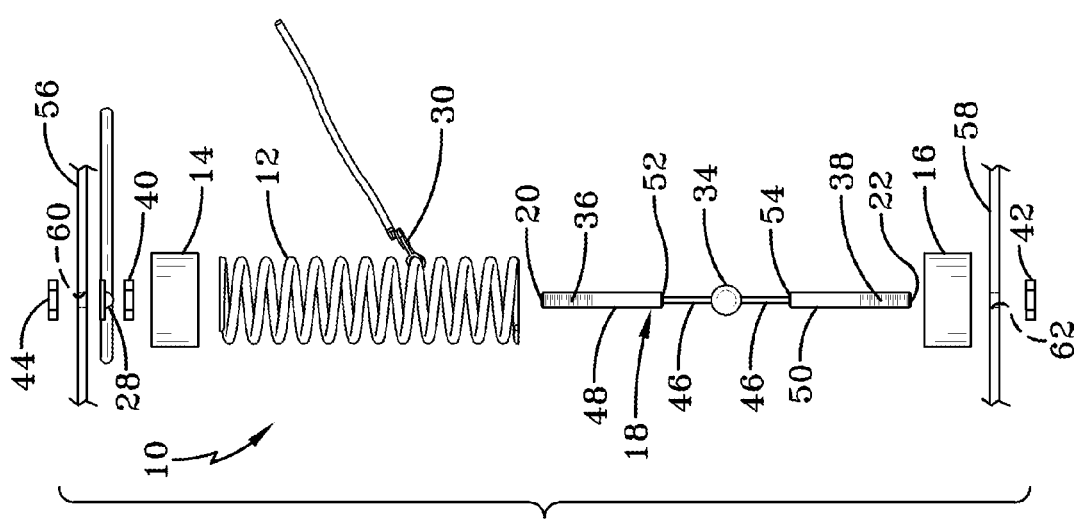

US 7,968,812 B2

SPRING JOINT WITH OVERSTRAIN SENSOR

ORIGIN OF INVENTION

The invention described herein was made in the performance of work under a NASA contract and by an employee of the United States Government and is subject to Public Law 96-517 (35 U.S.C. 5200 et seq.). The contractor has not elected to retain title to the invention.

FIELD OF THE INVENTION

The present invention relates to flexible joints that may be used, for example, in robots, prosthetic devices, mechanical arms, and other uses.

BACKGROUND

Flexible joints that provide restoring forces may be known, for example, from U.S. Pat. No. 3,990,116 to Fixel et al. and U.S. Pat. No. 3,266,059 to Stelle. A problem with conventional flexible joints may be the difficulty of integrating them into new products. The conventional joints that are easily integrated into new products may not, in general, provide restoring forces. In addition, the conventional joints may not include an overstrain sensor.

SUMMARY

In one aspect, a flexible joint may include a conductive compression spring having a longitudinal axis and a pair of non-conductive spring cages disposed at opposite ends of the compression spring and supporting the compression spring. A conductive member may be disposed inside the compression spring and extend between the pair of spring cages. One end of the conductive member may be fixed for movement with one of the spring cages and another end of the conductive member may be fixed for movement with another of the spring cages.

The ends of the conductive member may include threaded portions with nuts thereon for adjustably compressing the compression spring. The flexible joint may include an electrical connection on the conductive member and an electrical connection on the compression spring. The flexible joint may be movable in two degrees of freedom.

Further features and advantages of the invention will become apparent from the following detailed description taken in conjunction with the following drawings.

BRIEF DESCRIPTION OF THE DRAWINGS

FIG. 1 is a side view of one embodiment of a flexible joint.
FIG. 2 is a top view of the flexible joint of FIG. 1.
FIG. 3 is a perspective view of the flexible joint of FIG. 1.
FIG. 7 is an exploded view of the flexible joint of FIG. 1, showing an arrangement for attaching the flexible joint to first and second members.
FIG. 8 is a side view of an exemplary universal joint that may include the conductive member.

FIG. 9 is a side view of an exemplary ball joint that may include the conductive member.

DETAILED DESCRIPTION

Throughout the description and claims, "conductive" means "electrically conductive."

A flexible joint may provide a passive force that returns the flexible joint to a default position when external forces are removed. The flexible joint may be used in a robot, such as a rover robot used for space exploration. One design of a rover robot may use shape shifting tetrahedrons to generate locomotion. The angles produced by a rover robot with shape shifting tetrahedrons may be large and varied. Thus, a joint with passive compliance may be an appropriate component for a rover robot. The joint may also be used in place of a conventional flexible joint, such as, for example, a universal joint or a ball joint, where it may be desirable to return to a default position and to have passive compliance (such as, for example, in a shoulder joint).

The flexible joint may provide two degrees of freedom. The flexible joint may also provide a restoring force. The restoring force may be provided by a spring or springs that may return the joint to a default position. The restoring force may be proportional to the amount of lateral deflection of the spring or springs. This proportionality may allow the joint to be used in many of the under-constrained situations that may cause universal joints to lock up on themselves. The flexible joint may have a great deal of compliance, which may enable the joint to perform otherwise prohibitive tasks.

Figure 4:
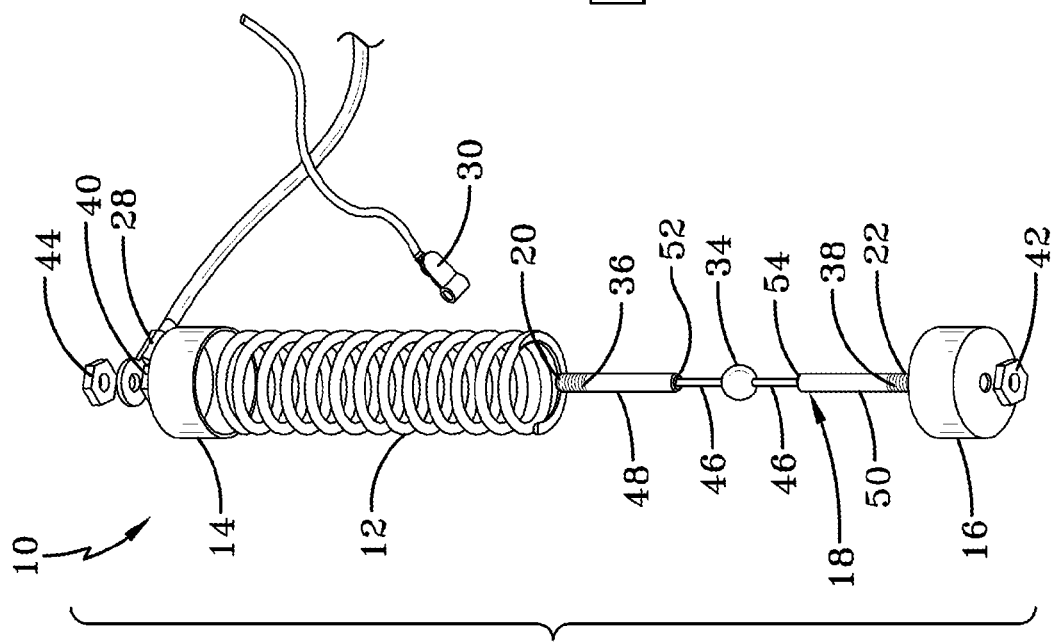
FIG. 4 is an exploded, perspective view of the flexible joint of FIG. 1.

FIG. 1 is a side view of one embodiment of a flexible joint 10. FIG. 2 is a top view of the flexible joint 10 of FIG. 1. FIG. 3 is a perspective view of the flexible joint 10 of FIG. 1. FIG. 4 is an exploded, perspective view of the flexible joint 10 of FIG. 1. Flexible joint 10 may include a conductive compression spring 12 and a pair of non-conductive spring cages 14, 16 that may be disposed at opposite ends of the compression spring 12. The non-conductive spring cages 14, 16 may support the compression spring 12. The compression spring 12 may have a longitudinal axis X-X (FIG. 3). A conductive member 18 may extend between the pair of non-conductive spring cages 14, 16 and may be disposed inside the compression spring 12. One end 20 of the conductive member 18 may be fixed for movement with one of the spring cages 14 and another end 22 of the conductive member 18 may be fixed for movement with another of the spring cages 16.

Figure 5:
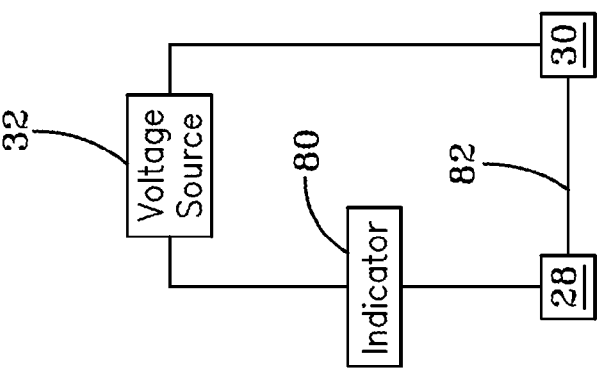
FIG. 5 is a schematic drawing of an exemplary electric circuit of the flexible joint.

Flexible joint 10 may further comprise an electrical connection 28 on the conductive member 18 and an electrical connection 30 on the compression spring 12. Electrical connections 28, 30 may be connected to a voltage source 32 and an indicator 80, as shown by way of example in FIG. 5. Indicator 80 may be, for example, one or more of a microprocessor, visual indicator, audio indicator, or other device. The circuit in FIG. 5 is "closed" by leg 82. Leg 82 represents the contact between the compression spring 12 and the conductive member 18 via electrical connections 28, 30. Indicator 80 may be placed between voltage source 32 and either electrical connection 28, 30.

In the embodiment of FIGS. 1-4 and as best seen in FIG. 4, conductive member 18 may comprise a cable. A generally spherical conductive member 34 may be disposed on the cable 18 inside the compression spring 12. Generally spherical conductive member 34 may have a diameter larger than a diameter of the cable 18. Cable 18 may include threaded portions 36, 38 and respective nuts 40, 42 for adjustably compressing the compression spring 12. The amount of initial compression of spring 12 may be used to control the resistance to deformations in the spring 12.

Cable 18 may comprise a smaller diameter portion 46 disposed between two larger diameter portions 48, 50. The smaller diameter portion 46 may be disposed inside the compression spring 12. Transitions 52, 54 from the smaller diameter portion 46 to the larger diameter portions 48, 50 may comprise pivot points. In one embodiment, the smaller diameter portion 46 may comprise a steel wire and the larger diameter portions 48, 50 may comprise brass swages.

Figure 6:
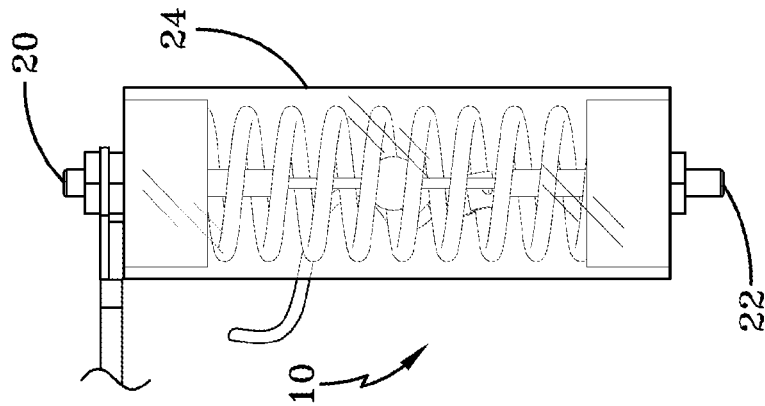
FIG. 6 is a view from the left side of FIG. 1, including a cover.

Flexible joint 10 may include non-conductive cover 24 (FIG. 6) for the spring cages 14, 16 and the compression spring 12. The cover 24 shown in FIG. 6 is transparent plastic, but the cover 24 need not be transparent or plastic.

An apparatus that may require a flexible joint 10 may be attached to the flexible joint 10 using various techniques. FIG. 7 shows one attachment method for an apparatus that may have first and second members 56, 58 that are movable relative to each other. First member 56 with opening 60 formed therein may be fixed between nuts 44 and 40, and second member 58 with opening 62 formed therein may be fixed between nut 42 and spring cage 16. The arrangement of FIG. 7 is exemplary only. The attachment method may vary depending on the particular application or use and the type of response desired from flexible joint.

The embodiment shown in FIGS. 1-4 operates as follows. When a force is applied normal to the longitudinal axis of the spring 12, torque may be generated. The spring 12 may react to this torque by deforming into a curve. This curvature may be called lateral bend. The lateral bend may provide the two degrees of freedom of the flexible joint 10. The two degrees of freedom may be defined by two mutually perpendicular directions Y and Z (FIG. 3) that are normal to the longitudinal axis X-X of the spring 12. The spring 12, so long as it has not exceeded its maximum deflection, may return to its normal, non-deflected state. The joint 10 may follow the spring 12 back and return to a default position that may match the normal, non-deflected state of the spring 12.

The lateral bend of the spring 12 may be proportional to the amount of force applied in a given direction. As the spring 12 undergoes lateral bend, it may follow an arched path. The smaller diameter portion 46 of the conductive member 18, however, may The joint 10 may be customized for a particular application. If the length of the smaller diameter portion 46 is very small, the transitions 52, 54 may move closer to spherical member 34 and may provide a well-defined pivot point. The position of this point in the spring 12 may also be adjusted by tightening down one or both of the larger diameter portions 48, 50 using nuts 40, 42. Alternatively, if the smaller diameter portion 46 is lengthened, then less lateral bend of the spring 12 may be required for the spherical member 34 to contact the spring 12.

Flexible joint 12 may allow much freedom of motion and compliance. It may be possible to adjust the restoring forces by tightening nuts 40, 42, to thereby compress spring 12. It may be possible to adjust the angle of deflection that triggers contact between the spherical member 34 and the spring 12 by moving the spherical member 34 along the smaller diameter portion 46. A lesser amount of lateral bend of spring 12 may be required for spherical member 34 to contact spring 12, if the diameter of spherical member 34 is increased, or if spherical member 34 is located closer to the center of conductive member 18. The non-conductive cover 24 (FIG. 6) may be necessary to cover the spring 12 because spring 12 may be carrying electrical current.

In embodiments where the conductive member 18 or smaller diameter portion 46 may be very short, the spherical member 34 may be eliminated. Without the spherical member 34, one may observe more closely the exact location where the spring 12 may be bending.

Flexible joint 10 may provide a restoring force that may prevent the joint 10 from twisting into a position where it locks up. This restoring force may also allow joint 10 to return to a default position, when all external forces have been removed. Joint 10 may be easier to mount that known joints. Joint 10 may replace a universal or ball joint. Joint 10 may be highly customizable. The magnitude of the restoring force and the pivot point for lateral bend may be adjusted by changing the amount of compression of spring 12, and/or the length of the smaller diameter portion 46 relative to the lengths of the large diameter portions 48, 50.

Joint 10 may also be adjusted so that a force of a specific magnitude may be required for contact between the spherical member 34 and the spring 12. Joint 10 may use a single spherical member 34 as a sensor for both degrees of freedom, whereas known joints may require two or more sensors.

In other embodiments of joint 10, the conductive member 18 may include any type of conductive flexible coupling, such as, for example, a universal joint 64 (FIG. 8) or a ball joint 66 (FIG. 9). Compression spring 12 may be disposed around the universal joint 64 with the threaded ends 70, 72 of universal joint 64 extending through spring cages 14, 16, similar to conductive member 18. Ball joint 66 may be utilized in a manner similar to universal joint 64. In these embodiments, the pivot point of the joint 10 may coincide with the pivot point of the flexible coupling that may include conductive member 18. For example, universal joint 64 may include pivot point 68 and ball joint 66 may include pivot point 74.

The various embodiments described above are provided by way of illustration only and should not be construed to limit the invention. Those of ordinary skill in the art will readily recognize various modifications and changes that may be made to the present invention without following the example embodiments and applications illustrated and described herein, and without departing from the spirit and scope of the present invention.

What is claimed is:
1. A flexible joint, comprising:
   a conductive compression spring having a longitudinal axis;
   a pair of non-conductive spring cages disposed at opposite ends of the compression spring and supporting the compression spring;
   a conductive member extending between the pair of spring cages and disposed inside the compression spring, one end of the conductive member being fixed for movement with one of the spring cages and another end of the conductive member being fixed for movement with another of the spring cages, the ends of the conductive member including threaded portions with nuts thereon for adjustably compressing the compression spring; and
   an electrical connection on the conductive member and an electrical connection on the compression spring,
   wherein the flexible joint is movable in two degrees of freedom.
2. The joint of claim 1, further comprising:
   a non-conductive cover for the spring cages and the compression spring.
3. The joint of claim 1, wherein the conductive member comprises a second flexible coupling.

4. The joint of claim 1, further comprising:
a voltage source connected to the electrical connections on the conductive member and the compression spring.

5. The joint of claim 1, wherein the two degrees of freedom are defined by two mutually perpendicular axes, both of the mutually perpendicular axes being normal to the longitudinal axis of the conductive compression spring.

6. The joint of claim 1, wherein the conductive member comprises a cable.

7. The joint of claim 6, further comprising:
a generally spherical conductive member disposed on the cable inside the compression spring and having a diameter larger than a diameter of the cable.

8. The joint of claim 6, wherein the cable comprises a smaller diameter portion disposed between two larger diameter portions with the smaller diameter portion disposed inside the compression spring.

9. The joint of claim 8, wherein transitions from the smaller diameter portion to the larger diameter portions comprise pivot points.

10. A flexible joint, comprising:
first and second members movable relative to each other;
a conductive compression spring having a longitudinal axis;
a pair of non-conductive spring cages disposed at opposite ends of the compression spring and supporting the compression spring, one of the spring cages being fixed for movement with the first member and another of the spring cages being fixed for movement with the second member;
a conductive member extending between the pair of spring cages and disposed inside the compression spring, one end of the conductive member being fixed for movement with one of the spring cages and another end of the conductive member being fixed for movement with another of the spring cages, the ends of the conductive member including threaded portions with nuts thereon for adjustably compressing the compression spring; and
an electrical connection on the conductive member and an electrical connection on the compression spring,
wherein the flexible joint is movable in two degrees of freedom.

11. The joint of claim 10, further comprising:
a non-conductive cover for the spring cages and the compression spring.

12. The joint of claim 10, wherein the conductive member comprises a second flexible coupling.

13. The joint of claim 10, further comprising:
an electrical connection on the conductive member and an electrical connection on the compression spring.

14. The joint of claim 10, further comprising:
a voltage source connected to the electrical connections on the conductive member and the compression spring.

15. The joint of claim 10, wherein the two degrees of freedom are defined by two mutually perpendicular axes, both of the mutually perpendicular axes being normal to the longitudinal axis of the conductive compression spring.

16. The joint of claim 10, wherein the conductive member comprises a cable.

17. The joint of claim 16, further comprising:
a generally spherical conductive member disposed on the cable inside the compression spring and having a diameter larger than a diameter of the cable.

18. The joint of claim 16, wherein the cable comprises a smaller diameter portion disposed between two larger diameter portions with the smaller diameter portion disposed inside the compression spring.

19. The joint of claim 18, wherein transitions from the smaller diameter portion to the larger diameter portions comprise pivot points.

* * * * *